Patented Oct. 13, 1931

1,827,285

UNITED STATES PATENT OFFICE

GEORG EBERT, FRIEDRICH AUGUST FRIES, AND WALTER REPPE, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY

POLYMERIZATION PRODUCTS OF DIOLEFINES

No Drawing. Application filed December 24, 1929, Serial No. 416,298, and in Germany January 22, 1929.

This invention relates to improvements in the polymerization of diolefines.

It has already been proposed to obtain products having great elasticity, which are capable of being vulcanized, from diolefines, such as butadiene, isoprene, dimethyl butadiene or homologues and analogues thereof, by polymerization in the presence of alkali metals or alkaline earth metals or mixtures or alloys of the same with one another or with other metals. To these products there is the objection that they can only be worked up on the rollers with difficulty and that they often dissolve only with difficulty in solvents or merely swell therein.

We have now found that in the polymerization of diolefines or homologues and analogues thereof with alkali metals or alkaline earth metals or mixtures or alloys of the same with one another or with other metals (the said metals all being understood to be equivalents of alkali metals) readily soluble, plastic, tenacious products are obtained by working in the presence of organic solvents and by continually withdrawing the readily soluble polymerization products in the form of their solutions as soon as they are formed. This may, for example, be effected by allowing the solvent to flow over the catalyst and continuously introducing the diolefine into the solvent before it leaves the catalyst, the rate of flow of the solvent being sufficiently slow to effect the polymerization, or by employing a flowing solution of the diolefine. It is advisable to provide that the alkali metal is continually covered by the liquid. As examples of the solvents suitable for application in the process according to the present invention may be mentioned petroleum ether, ether, cyclohexane, benzene and the like. The polymerization may be carried out at atmospheric, elevated or reduced pressures. The products thus obtained are sometimes unsuitable for conversion by vulcanization into products resembling soft rubber of high quality, but they are eminently suitable for the preparation of conversion products such as solid artificial masses by a heat treatment, or for the manufacture of threads, bands, foils, films, discs and the like by vulcanization or by a treatment at an elevated temperature in an atmosphere of a gas containing or supplying oxygen, and they may be satisfactorily worked up into masses similar to hard rubber.

The following examples will further illustrate the nature of this invention, but the invention is not restricted to these examples.

Example 1

Metallic sodium in more or less fine dispersion is introduced into the extraction chamber of a Soxhlet apparatus. The boiling flask is charged with pure dry ether. The ether is heated to boiling and gaseous butadiene is led into the extraction chamber. The polymerization commences more or less quickly according to the purity of the butadiene employed. The commencement of the polymerization may be detected by the fact that the solution in the boiling flask becomes viscous. It is recommended that the outlet device of the Soxhlet apparatus be arranged so that the solution continually flows out and so that the sodium remains continually covered with solvent. By appropriate regulation of the amount of butadiene introduced in unit time and by regulation of the rate of flow of the solvent through the extraction chamber, the concentration of the butadiene and that of the polymerization product may be regulated and kept constant. In this manner very uniform products are obtained. When the solution becomes very viscous, it is exchanged for fresh ether and the solvent is evaporated off or is expelled with steam. Pale, tenacious, viscous, sticky products are obtained. They are unsuitable for the manufacture of soft rubber products of high quality, but are eminently suitable for the preparation of conversion products, such as solid artificial masses by heat treatment, or for the preparation of threads, bands, foils, films, discs and the like by treatment at elevated temperatures with an agent supplying oxygen or by vulcanization and may be satisfactorily worked up into masses similar to hard rubber.

Example 2

The procedure described in Example 1 is followed, but cyclohexane is employed as the solvent and the temperature is kept at from 40° to 50° C. The polymerization proceeds rapidly. After expelling the cyclohexane from the very viscous solution by means of steam, a tenacious, viscous, plastic, very firmly adhering polymerization product remains behind, which has substantially the same properties as the product obtained in Example 1.

What we claim is:—

1. In the polymerization of a diolefine in the presence of an alkali metal, the steps of working in the presence of an inert organic solvent for the polymerization products, of the group consisting of hydrocarbons and ethers, and of continuously withdrawing said polymerization products in the form of their solutions as soon as they are formed.

2. In the polymerization of a diolefine in the presence of an alkali metal, the steps of working in the presence of an inert organic solvent for the polymerization products, of the group consisting of hydrocarbons and ethers, and of continuously withdrawing said polymerization products in the form of their solutions as soon as they are formed, while providing that the alkali metal is continually covered by the solvent.

3. In the polymerization of a diolefine in the presence of an alkali metal, the steps of allowing an inert organic solvent for the polymerization products, of the group consisting of hydrocarbons and ethers, to flow over the alkali metal, continuously introducing the diolefine into the solvent before it leaves said metal and adjusting the rate of flow of the solvent sufficiently slow to effect the polymerization.

4. In the polymerization of butadiene with sodium, the steps of allowing ether to flow over the sodium, continuously introducing butadiene into the ether before it leaves the sodium and adjusting the rate of flow of the ether sufficiently slow to effect the polymerization.

5. In the polymerization of a diolefine in the presence of an alkali metal, the steps of working in the presence of an ether and of continuously withdrawing the polymerization products in the form of their solutions in the ether as soon as they are formed, while providing that the alkali metal is continually covered by the solvent.

6. In the polymerization of a diolefine in the presence of an alkali metal, the steps of allowing an ether to flow over the alkali metal, continuously introducing the diolefine into the ether before it leaves said alkali metal and adjusting the rate of flow of the ether sufficiently slow to effect the polymerization.

7. In the polymerization of butadiene in the presence of sodium, the steps of allowing cyclohexane to flow over the sodium, continuously introducing the butadiene into the cyclohexane before it leaves the sodium and adjusting the rate of flow of the cyclohexane sufficiently slow to effect the polymerization.

In testimony whereof we have hereunto set our hands.

GEORG EBERT.
FRIEDRICH AUGUST FRIES.
WALTER REPPE.